United States Patent Office 3,264,140
Patented August 2, 1966

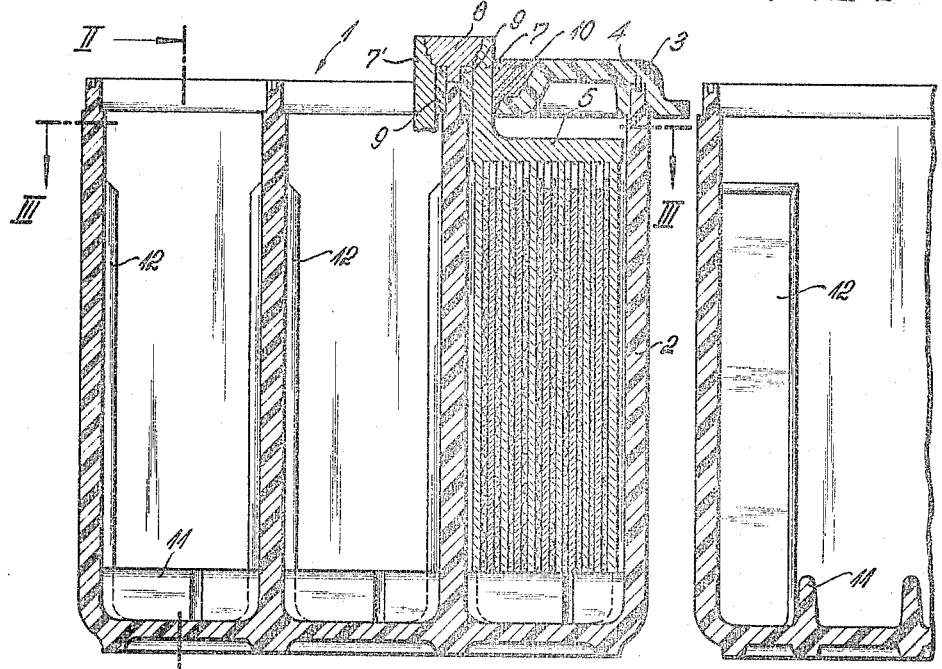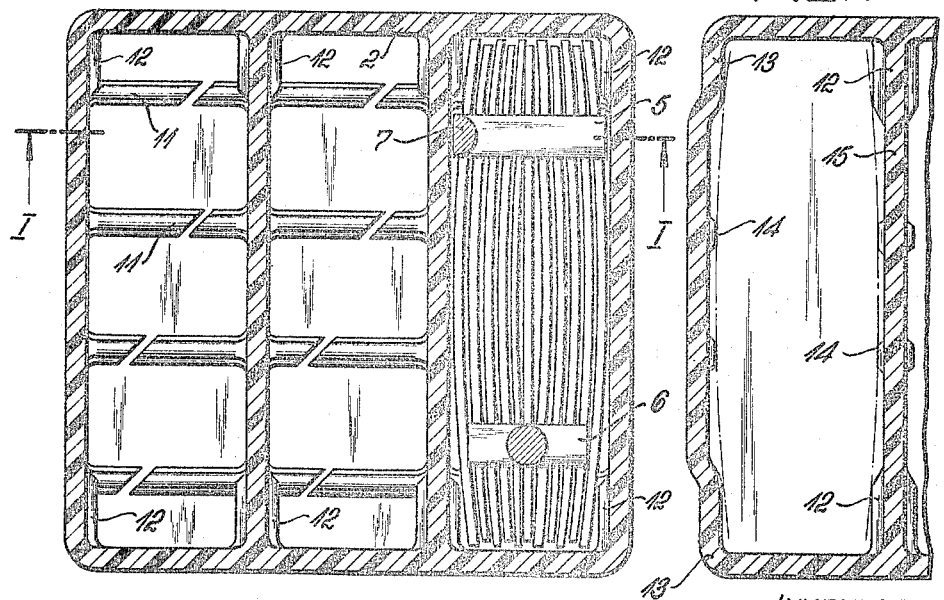

3,264,140
ELECTRIC STORAGE BATTERY
Ernst Göhle, Hildesheim, Germany, assignor to Robert Bosch G.m.b.H., Stuttgart, Germany
Filed Nov. 27, 1963, Ser. No. 326,528
Claims priority, application Germany, Dec. 7, 1962, B 69,902
6 Claims. (Cl. 136—81)

The present invention relates to batteries and in particular to electric storage batteries of the type which are used in automobiles and the like. One of the problems encountered in batteries of the above type is the securing of the plate assemblies in the cells in such a manner that these plate assemblies do not vibrate. Thus, it is not only necessary to secure the plate assemblies against vertical vibration between the cover and bottom wall of the battery housing, but in addition, it is important to eliminate horizontal vibrations which might cause the plate assemblies and the pole pieces connected thereto to turn or shift angularly in the cells. This latter consideration is of the utmost importance inasmuch as the sealing of the cells at the places where the pole pieces extend from the latter creates great difficulties. Such turning of the pole pieces is difficult to avoid in conventional structures because the pole pieces are made of a lead alloy and are of a relatively small cross-section so that they can present but little resistance to turning, while the mass of the lead plates during vibration of the plate assemblies can exert on the pole pieces a turning moment which becomes greater as the length of the lever arm connected to the pole pieces is greater. Moreover, with such constructions the tendency of the plates and separators of each plate assembly to become loose during the life of the battery greatly reduces the useful life of the battery.

It is accordingly a primary object of the present invention to provide a storage battery structure which will avoid the above drawbacks.

Thus, it is an object of the invention to provide a construction where each plate assembly is reliably secured against horizontal as well as vertical vibration and thus the tendency of the pole pieces to turn is greatly diminished.

Moreover, it is an object of the present invention to provide a structure which will greatly retard the tendency of the plates and separators of a plate assembly to loosen so as to greatly increase the life of the structure.

In addition, it is an object of the invention to provide a structure which will not only guarantee fluid-tightness at the connections between pole pieces of adjoining cells but which will also secure such pole pieces to the battery housing to also prevent turning of the pole pieces in this way.

With the above objects in view, the invention includes, in a storage battery, a plate assembly composed of a series of plates and separators therebetween and terminating in a pair of end plates which are of rectangular configuration and which respectively have elongated end edge portions. A thermoplastic housing has in its interior a cell which receives the plate assembly, and the housing has a pair of parallel walls between which the plate assembly is located with the parallel walls extending substantially parallel to and being closely adjacent to the end plates of the plate assembly. These parallel walls are respectively provided with pairs of elongated ribs which respectively engage and extend longitudinally along the end edge portions of the end plates at the exterior thereof and which compress the plate assembly between the end edge portions of the end plates thereof.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a sectional view of a battery structure according to the invention, the section of FIG. 1 being taken along line I—I of FIG. 3 in the direction of the arrows;

FIG. 2 is a fragmentary transverse section of the structure of FIG. 1 taken along line II—II of FIG. 1 in the direction of the arrows;

FIG. 3 is a sectional plan view of the structure of FIG. 1 taken along line III—III of FIG. 1 in the direction of the arrows; and FIG. 4 is a fragmentary sectional plan view of another embodiment of a structure according to the present invention.

Referring to FIGS. 1–3, there is shown therein part of the structure of an electric storage battery 1, this structure including a thermoplastic housing 2 which in the illustrated examples forms three cells. The upper peripheral edge of the housing 2 is reduced at all of the walls thereof and extends into grooves of a cover 3 also made of a thermoplastic material, the grooves of the cover 3 forming a network of grooves which receive not only the continuous upper edge of the outer peripheral walls of the housing but also of the transverse partitions which separate the cells. The upper end face of the housing walls and partitions and the base of all of the grooves of the cover 3 are formed with additional grooves which cooperate to form a passage, and this passage is filled with a sealing mass 4 which is fused with the housing 2 and the cover 3 so as to fluid-tightly fasten the cover 3 to the housing 2.

A plate assembly composed in a well-known manner of a series of plates and separators therebetween is shown in the right cell of FIGS. 1 and 3, and the plates are bridged also in a conventional manner by the plate bridges 5 and 6 which are of opposite polarity, respectively. The bridge 6 carries between its ends one of the poles of the battery while the bridge 5 integrally carries at one of its ends a pole piece 7 which is adjacent to and extends outwardly beyond the partition between the right and intermediate cells of FIGS. 1 and 3, the intermediate cell of course having an identical plate assembly the plates of which are interconnected by a bridge which carries a pole piece 7' extending upwardly from the intermediate cell as shown in FIG. 1, and these pole pieces 7 and 7' of the adjoining cells are electrically interconnected by a bridging member 8 which extends between and is fused in a known way with the pole pieces 7 and 7'. Of course, all of the cells accommodate plate assemblies, respectively, which are operatively connected with poles which are electrically connected to each other in the above-described manner. Thus, the pair of pole pieces 7, 7' and the bridging member 8 connected thereto extend around the upper edge of the partition between the right and intermediate cells of FIGS. 1 and 3, and a body of casting resin 9 is situated between this assembly 7, 7', 8 and the partition and is fluid-tightly fused to the latter for sealing the passage of the pole pieces outwardly from the cells and for forming a fixed connection between the assembly 7, 7', 8 and the partition. In the illustrated example the body 9 includes a pair of portions 9 engaging the partitions and the pole pieces and bridging member in the manner indicated in FIG. 1. Moreover, the cover 3 is formed with a recess through which the pole pieces extend, and this recess is filled with a mass 10 of a suitable plastic which may, for example, be poured into this recess so that upon solidifying this mass 10 will also serve to seal the passage of the pole pieces to the exterior of the battery and to fix the pole pieces to the battery. As apparent from FIG. 3, due to the intermediate location of the pole which is integrally connected to the bridge 6, this bridge 6 provides only relatively short moment arms with respect to the pole piece connected thereto. However, since the pole piece 7 is connected to one end of the bridge 5 a moment arm of considerable length is connected to the pole piece 7, and the structure described below secures the plate assembly against vibration to prevent any tendency of the plate assembly to turn in a manner which might cause the considerable mass of the plate assembly to exert through the relatively long moment arm of the bridging member 5 a turning force on the pole piece 7 which might cause the latter to turn and prevent proper sealing of the pole piece.

As apparent from FIGS. 1 and 3, the plate assembly includes a series of plates and separators therebetween which terminates in a pair of end plates which are of rectangular configuration and each of which has a pair of end edge portions. The housing 2 has at each cell a pair of parallel walls which are substantially parallel and adjacent to the end plates of the plate assembly, and each of these walls of each cell integrally carries a pair of elongated ribs 12 the configuration of which is clearly apparent from FIG. 2. The floor or bottom wall of the housing is integral with upwardly directed ribs 11 on which the plate assembly rests and between which sludge may accumulate and the arrangement is such that the pairs of ribs 12 of each housing wall are in alignment with each other with the distance between the aligned ribs in each cell less the distance between the end plates of the plate assembly before the latter is introduced into the cell. Thus, when the plate assembly is introduced into the cell the ribs 12 will engage the exterior surfaces of the end plates along their end edge portions, respectively, and will compress the assembly between the end edge portions of the end plates, as indicated most clearly in FIG. 3. As a result of this compression the intermediate portion of the plate assembly will bulge toward the adjoining housing walls. Because the plate assembly is compressed at its ends in this way it is securely held against vibration by the ribs 12 and thus eliminates any tendency of horizontal vibrations to turn the plate assembly. The upper ends of the ribs 12 are downwardly inclined and in addition the edges of the ribs 12 are rounded so that the plate assembly can easily be shifted into position between the ribs 12. The elastic deformation of the plate assembly in this manner results particularly in compression of the separators, and this arrangement according to which compression is provided only at the vertical end regions of the plate assembly greatly increases the useful life of the structure by greatly extending the time required for the components of the plate assembly to loosen in their positions relative to each other.

In the embodiment of FIG. 4, the structure is the same as that described above except that only the partitions 15 are provided with the ribs 12. The outer housing walls which are parallel to the partitions have inwardly located elongated vertical portions 13 located inwardly of the remainder of these outer housing walls so that these portions 13 form the ribs which act in the manner described above to compress the plate assemblies together with the ribs 12 of FIG. 4.

Moreover, the embodiment of FIG. 4 shows additional ribs 14 carried by the walls of each cell which are parallel to the end plates of the plate assembly therein, and these ribs 14 protrude to an extent less than the ribs 12 and 13 so that while the plate assembly can bulge at its intermediate portion the extent to which it can approach the cell walls is limited by these vertically extending ribs 14 which engage intermediate exterior surface portions of the end plates. Of course, such ribs 14 may be included in the embodiments of FIGS. 1-3. With this construction the liquid in the cells can circulate more freely along the exterior surfaces of the intermediate regions of the end plates which are indicated in dot-dash lines in FIG. 4.

It will be understood that each of the elements described above, or two or more together, may also find a useful application in other types of batteries differing from the types described above.

While the invention has been illustrated and described as embodied in storage batteries, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a storage battery, in combination, a thermoplastic housing having in its interior at least two cells and including an intermediate transverse partition situated between and separating said cells from each other, said cells being adapted to respectively receive plate assemblies which respectively have pole pieces operatively connected thereto and located adjacent said partition and extending beyond an upper edge thereof; an electrically conductive bridging member extending between and connected to said pole pieces for electrically interconnecting the latter and located over said upper edge of said partition; and a body of casting resin located between said partition and said pole pieces and bridging member for fluid-tightly sealing the battery at the region where the assembly of pole pieces and bridging member extends over said partition between said cells, said casting resin also fixing said pole pieces and bridging member to said partition.

2. In a storage battery, in combination, a plate assembly composed of a series of elastically deformable plates and separators received therebetween said plate assembly terminating in a pair of end plates of rectangular configuration and each of said plates having elongated end edge portions; spacing means holding said plate assembly at portions thereof located between and spaced from said end edge portions thereof and maintaining said plates at the respective portions thereof at a predetermined distance; and a housing having in its interior a cell in which said plate assembly is located and said housing including a pair of spaced walls between which said plate assembly is located with said walls adjacent to said end plates, respectively and elongated rib portions provided on the respective walls and projecting into said cell, each of said rib portions engaging and extending longitudinally along respective end edge portions at the exterior of said end plates which are held by said spacing means, so as to resiliently compress said end edge portions of said plate of said plate assembly, whereby the individual plates are elastically deformed by said rib portions and undesirable vibration of said plate assembly is prevented.

3. A storage battery as defined in claim 2, wherein one wall of said pair of walls is an outer wall of said housing and said ribs of said outer wall are formed by elongated portions of said outer wall which are located inwardly of the remainder of said outer wall.

4. A storage battery as defined in claim 2, wherein said elastically deformed plates of said plate assembly bulge at intermediate portions thereof located between said spacing means and the respective end edge portions, and wherein said walls of said housing have in the region of said intermediate portions of said plates at the exterior surfaces of said end plates at least a pair of additional ribs which protrude from said walls to an extent less than said ribs which engage said end edge portions, said additional ribs engaging the exterior surface of said end plates at intermediate portions thereof to limit the extent to which said plate assembly bulges toward said walls of said housing.

5. A storage battery as defined in claim 2, wherein said spacing means comprises bridge means rigid with said housing.

6. A storage battery as defined in claim 5, wherein said bridge means comprises a pair of bridge members extending intermediate and rigid with said walls across said plate assembly, said bridge members being arranged intermediate the respective end edge portions of the plates of said plate assembly with spacing from each other and one of said bridge members being connected to alternate ones of said plates and the other being connected to the remaining ones of said plates.

References Cited by the Examiner
UNITED STATES PATENTS

| | | | |
|---|---|---|---|
| 709,157 | 9/1902 | Kennedy | 136—79 |
| 1,514,670 | 11/1924 | Melchior | 136—166 |
| 1,888,890 | 11/1932 | Sandman | 136—81 |
| 1,919,341 | 7/1933 | Marsden | 136—81 |
| 1,972,433 | 9/1934 | Williams et al. | 136—143 |
| 1,980,903 | 11/1934 | Blake | 136—81.31 |
| 2,154,841 | 4/1939 | Gill | 136—81.4 |
| 2,189,327 | 2/1940 | Rieser | 136—134 |
| 3,061,661 | 10/1962 | Seeley | 136—135 |

WINSTON A. DOUGLAS, *Primary Examiner.*

A. SKAPARS, *Assistant Examiner.*